Figure 1:
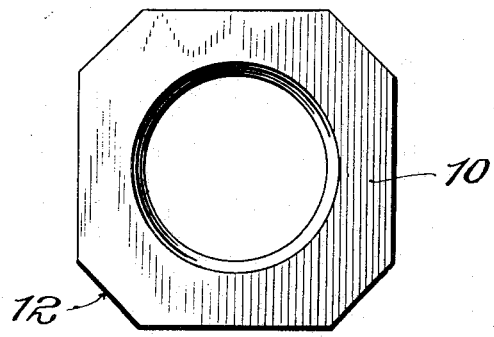

Oct. 31, 1933. P. W. DIETER 1,933,007
NUT
Original Filed July 22, 1930

Inventor
Paul W. Dieter,
By D. P. Wolhaupter
Attorney

Patented Oct. 31, 1933

1,933,007

UNITED STATES PATENT OFFICE 1,933,007

NUT

Paul W. Dieter, New York, N. Y.

Application July 22, 1930, Serial No. 469,782
Renewed September 15, 1933

6 Claims. (Cl. 85—32)

This invention relates to nuts, and has for its primary object to provide a nut possessing the desirable features of both a square and a hexagonal nut, which is capable of use in any capacity where either a square or a hexagonal nut may be used, and which may be formed from a standard nut strip at no greater cost than either a square or hexagonal nut.

With the foregoing and other objects in view, which will more fully appear as the nature of the invention is better understood, the invention consists in a nut having the features of novelty as will be hereinafter more fully described, illustrated in the accompanying drawing and defined in the appended claims.

In the drawing:—

Figure 2:
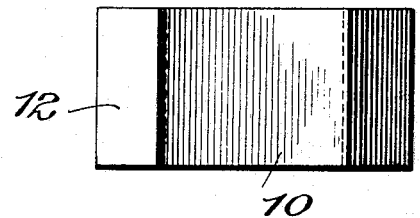

Figure 1 is an end view of a nut constructed in accordance with the invention; and Figure 2 is a side elevation.

According to United States standards for both square and hexagonal nuts, the short diameter of an unfinished nut is equal to one and one-half times the diameter of the bolt plus one-eighth of an inch, and for a finished nut, one and one-half times the diameter of the bolt plus one-sixteenth of an inch. For a hexagonal nut the long diameter is equal to 1.155 times the short diameter, and for a square nut the long diameter is equal to 1.414 times the short diameter. Thus, for a one-inch nut, for example, that is, a nut adapted for use with a bolt one inch in diameter, the long diameter of an unfinished hexagonal nut is approximately 1⅞" and of an unfinished square nut, approximately 2¹⁹⁄₆₄", which means, of course that a hexagonal nut may be turned within a lesser area than a square nut of equal size.

According to the present invention, the nut 10 approximates a square nut the corners of which are removed as indicated at 12 to such an extent that the long diameter of the present nut is no greater and preferably the same as the long diameter of a hexagonal nut of corresponding size. Thus, the present nut is adapted for use in any capacity where either a hexagonal or a square nut may be used, and the one nut therefore is made to answer the purposes of either a hexagonal or a square nut. Moreover, the short diameter of the present nut is the same as the short diameter of either a square or a hexagonal nut of corresponding size, and, therefore, the present nut may be formed from nut strips of the same width as are at present employed from which to form square and hexagonal nuts.

Without further description it is thought that the features and advantages of the invention will be readily apparent to those skilled in the art, and it will of course be understood that changes in the form, proportion and minor details of construction may be resorted to, without departing from the spirit of the invention and the scope of the appended claims.

I claim:—

1. An approximately square nut the long diameter of which is no greater than the long diameter of a hexagonal nut of corresponding size.

2. An approximately square nut the long diameter of which is approximately equal to the long diameter of a hexagonal nut of corresponding size.

3. A nut of the square nut type the corners of which are cut away to such an extent that the long diameter of the nut is no greater than the long diameter of a hexagonal nut of corresponding size.

4. A nut of the square nut type the corners of which are cut away to such an extent that the long diameter of the nut is approximately equal to the long diameter of a hexagonal nut of corresponding size.

5. A nut having a pair of parallel opposite sides and a second pair of parallel opposite sides disposed at right angles to said first sides, the corner portions of said nut being removed to such an extent that the greatest distance between any two diametrically opposite corner portions of said nut is no greater than the long diameter of a hexagonal nut of corresponding size.

6. A nut having a pair of parallel opposite sides and a second pair of parallel opposite sides disposed at right angles to said first sides, the corner portions of said nut being removed to such an extent that the greatest distance between any two diametrically opposite corner portions of said nut is approximately equal to the long diameter of a hexagonal nut of corresponding size.

PAUL W. DIETER.